A. ALFSON.
GEARING.
APPLICATION FILED DEC. 1, 1910.

1,004,228.

Patented Sept. 26, 1911.
2 SHEETS—SHEET 2.

Witnesses:
H. R. L. White
R. A. White

Inventor:
Andrew Alfson
by Robert Kletz
Atty.

UNITED STATES PATENT OFFICE.

ANDREW ALFSON, OF CHICAGO, ILLINOIS, ASSIGNOR OF ONE-HALF TO JOSEPH E. QUIN, OF CHICAGO, ILLINOIS.

GEARING.

1,004,228. Specification of Letters Patent. Patented Sept. 26, 1911.

Application filed December 1, 1910. Serial No. 595,141.

*To all whom it may concern:*

Be it known that I, ANDREW ALFSON, a citizen of the United States, and residing at Chicago, in the county of Cook and State of Illinois, have invented a new and useful Improvement in Gearing, of which the following is a complete specification.

The main objects of this invention are to provide gearing for a hoisting drum which is adapted to exert the power or driving force equally on diametrically opposite sides of the drum thereby causing a minimum amount of wear on the bearings of the drum shaft; and to provide a gearing for a hoisting drum adapted to divide the power from the drive shaft and apply it equally on opposite sides of the drum.

Figure 1:
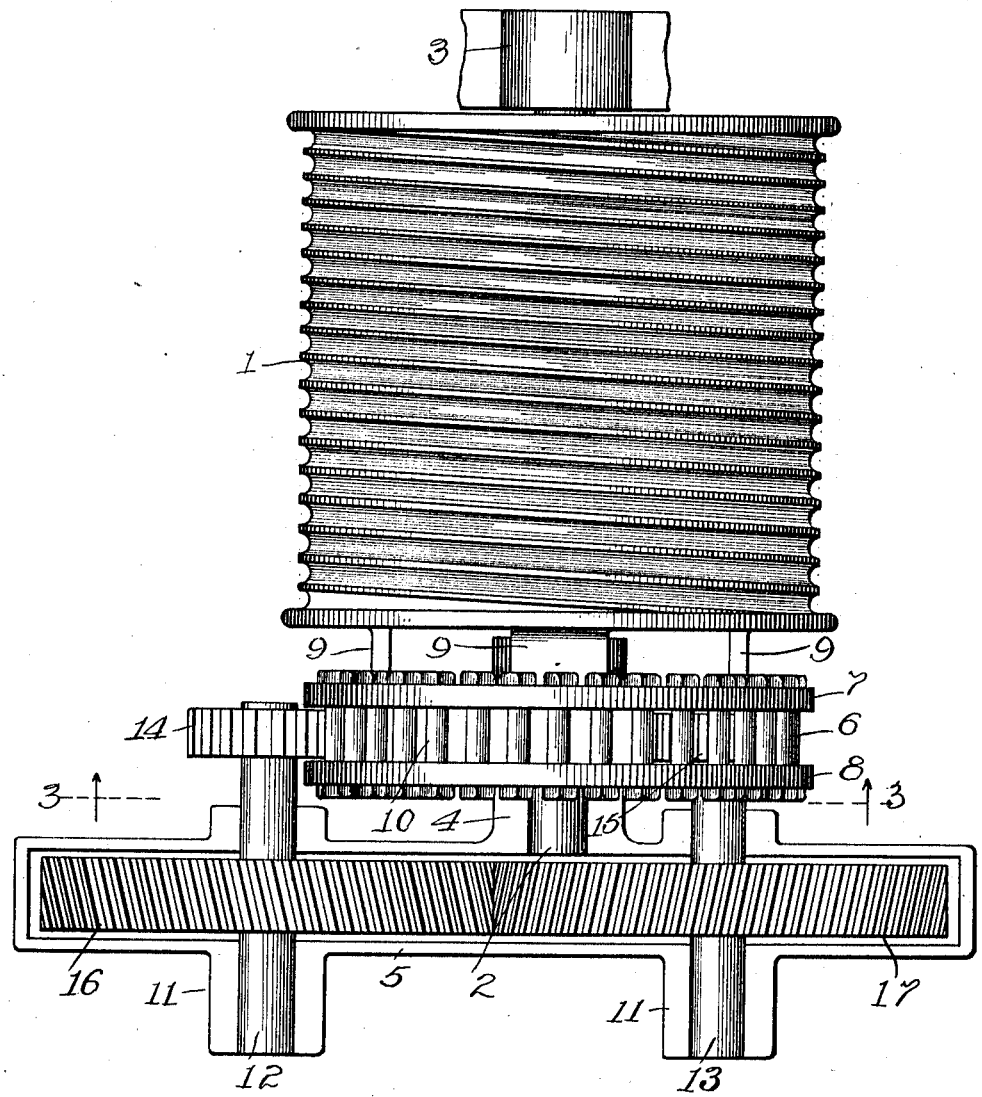
Figure 2:
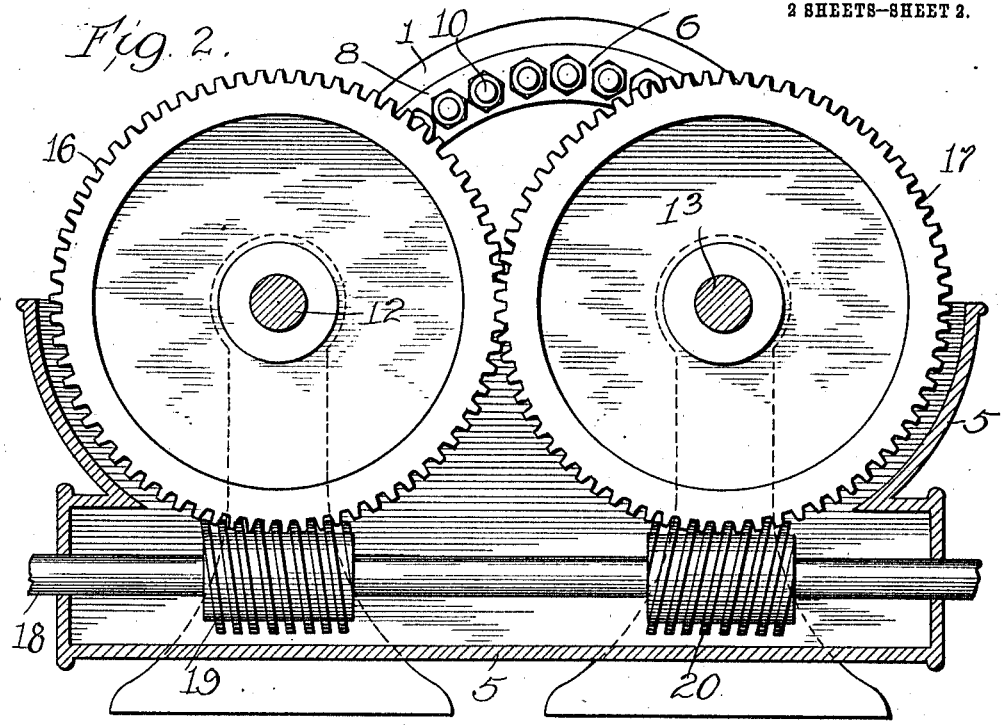
Figure 3:
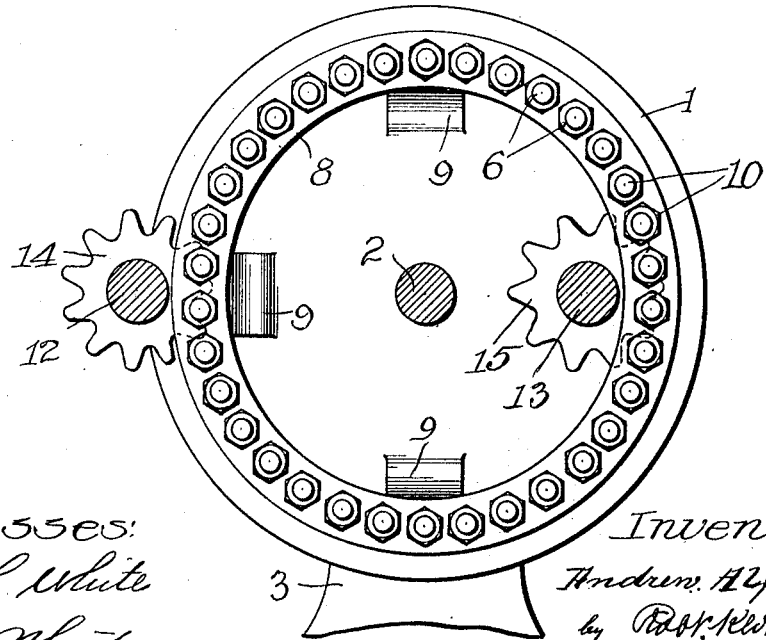

A specific construction embodying the invention is illustrated in the accompanying drawings, in which:

Figure 1 is a top plan view of the gearing applied to a hoisting drum with the cover of the gear case removed. Fig. 2 is a transverse section taken through the gear case and showing the driving mechanism in elevation. Fig. 3 is a section taken on line 3—3 of Fig. 1.

In the construction shown, the drum 1, which may be of any size and construction, is rigidly secured on the drum shaft or axle 2. The shaft 2 is journaled in a bearing standard 3 and in suitable bearings 4 on the gear case 5.

Rigidly secured to one end of the drum is an annular driven or drum gear 6, which has but a single set of cogs by means of which the gear is driven simultaneously from both its outer and inner circumferences. Said gear 6 comprises two annular members or rings 7 and 8, of which the ring 7 is rigidly secured to the drum 1 by means of arms 9. Stud-pins or bolts 10 connect the two rings together and space them the desired distances apart. The pins or bolts 10 are arranged at regular intervals on the rings and provide the single set of cogs or gear teeth for the gear, which cogs are adapted to be engaged by the driving pinions from both the inner and the outer circumferences of the gear.

Journaled in suitable bearings 11 on the gear case 5 are shafts 12 and 13, which have pinions 14 and 15 respectively thereon which are of the same size and both mesh with the gear teeth 10. The shafts 12 and 13 are so arranged that the pinion 14 meshes with the gear teeth from the outer circumference of the gear 6 and the pinion 15 meshes with the gear teeth from the inner circumference of said gear.

Rigidly secured on the shafts 12 and 13 are the worm gears 16 and 17 which are of equal size and mesh with each other and drive the shafts 12 and 13 in opposite directions. A drive shaft 18 is journaled in the gear case beneath the worm gears 16 and 17, and is provided with right and left threaded worms 19 and 20, of equal size, which mesh with the gears 16 and 17 respectively and act to drive them in opposite directions.

The operation of the construction shown is as follows: When the drive shaft 18 is driven, the worms 19 and 20 drive the gears 16 and 17 in opposite directions, thereby driving the pinions 14 and 15 in opposite directions. Since one of said pinions operates from the outside of the gear 6 and the other from the inside of the gear, and both on the same set of cogs or gear teeth, they act with equal force in the same direction and at the same speed on said gear, and thereby drive the drum. The gear case 5 may be partially filled with oil to render the action of the worms on the worm gears easy and noiseless. With this construction it is obvious that the power from the power shaft 18 is exerted with equal force on diametrically opposite sides of the gear 6 through the pinions 14 and 15, and therefore the strain on the drum is equally divided.

While I have shown but one specific construction of the invention, it will be understood that various details of the construction shown may be varied or omitted without departing from the scope of the claims.

I claim:

1. Gearing, comprising an annular gear having a single set of teeth accessible from both its inner and outer sides, a pair of parallel shafts, one extending into and the other on the outer side of said gear, pinions on said shafts meshing with said teeth respectively from the inner and outer sides of the gear, worm gears rigidly secured on said shafts and meshing with each other, a worm shaft, and worms on said shaft adapted to drive the worm gears in opposite directions.

2. Gearing, comprising two annular members lying in parallel planes, pins rigidly connecting said members together and providing gear teeth, diametrically opposed pinions meshing with said teeth, one from the inner and one from the outer side of said members, parallel shafts rigidly secured in said pinions, intermeshing worm gears on said shafts, a worm shaft, and worms thereon meshing with said gears.

3. Gearing, comprising a drum, an annular member rigidly secured on the end of the drum concentric therewith, a second member concentric with the first annular member, pins rigidly connecting said members together and spacing them a distance apart, diametrically disposed pinions projecting between said members and engaging said pins, one from the inner and one from the outer side of said members, parallel shafts in said pinions, intermeshing worm gears on the shafts, a shaft beneath said gears, and worms thereon meshing with said gears.

In witness whereof I have hereunto subscribed my name in the presence of two witnesses.

ANDREW ALFSON.

Witnesses:
J. E. QUINN,
GEORGE CORBAT.

Copies of this patent may be obtained for five cents each, by addressing the "Commissioner of Patents, Washington, D. C."